United States Patent Office 3,420,903
Patented Jan. 7, 1969

3,420,903
METHOD OF MAKING t-BUTYLLITHIUM
William Novis Smith, Jr., Exton, Pa., assignor to Foote Mineral Company, Exton, Pa., a corporation of Pennsylvania
No Drawing. Continuation-in-part of application Ser. No. 592,248, Oct. 28, 1966. This application Feb. 7, 1967, Ser. No. 614,422
U.S. Cl. 260—665   8 Claims
Int. Cl. C07f 1/02

ABSTRACT OF THE DISCLOSURE

T-butyl chloride is reacted with lithium containing a small amount of sodium in the presence of a small amount of lithium alkoxide containing from 1 to 10 carbon atoms.

---

This application is a continuation-in-part of application Ser. No. 597,248, filed Nov. 28, 1966 now abandoned.

The present invention relates to an improvement in the preparation of t-butyllithium; and, more particularly, the present invention relates to an improvement in the preparation of t-butyllithium by the reaction of t-butyl chloride with dispersed lithium (containing a small amount of sodium) whereby the yield of t-butyllithium is marketedly improved in a controlled and consistent manner.

The preparation of t-butyllithium by reaction between t-butyl chloride and dispersed lithium metal containing a small amount of sodium is well known (see, for example, Journal of the American Chemical Society, vol. 81, pp. 1497–1503, March 20, 1959, footnote 38b). Up to the present time, the process in the hands of various investigators, has given widely varying yields without any apparent reason. An explanation for these results, in the light of my own findings, is set forth hereinafter. At any rate, the situation existing prior to the present invention was not completely satisfactory.

It is the principal object of the present invention to provide an improved process for preparing t-butyllithium.

It is another object of the invention to provide an improvement in the conventional method of preparing t-butyllithium providing markedly improved yields in a controlled and consistent manner.

A further object of the present invention is to provide consistently, markedly greater yields in t-butyllithium through an inexpensive improvement in the conventional method.

Other objects will become apparent from a consideration of the following specification and claims.

The present invention comprises, in the preparation of t-butyllithium by reacting t-butyl chloride with lithium containing a small amount of sodium, the improvement which comprises the step of providing, in contact with the stated reactants, a lithium alkoxide containing from 1 to 10 carbon atoms in an amount of at least 0.3%, by weight, based on the weight of the t-butyl chloride.

As stated, except for the inclusion of the lithium alkoxide as specified herein, the process may be that which is conventional and well known. Thus, although the reaction theoretically requires two mols of lithium per mol of t-butyl chloride, the extra lithium forming lithium chloride, it is preferred in practice to employ excess lithium. This excess may be up to about 25%, advantageously from about 20 to about 25%.

The lithium metal will be finely-divided; that is, in well known dispersion form. Such dispersions are prepared by stirring the molten metal into an inert liquid, such as mineral oil, hexane, and the like, so that the metal solidifies as tiny droplets, usually no more than about 100 microns in size and preferably from about 25 to about 75 microns. The finely-divided metal may be filtered from the liquid to provide, after washing and drying, what is known as dry dispersion, or, after simply removing the bulk of the liquid, as by filtering or decanting, the metal may be washed with and reslurried in another liquid.

As stated, the lithium will contain a small amount of sodium as by adding the sodium to molten lithium in preparing the above-described dispersion. The amount of sodium so added will generally range from about 0.3 to about 2%, and preferably from about 0.5 to about 1%, by weight, based on the weight of the lithium.

In carrying out the reaction, the finely-divided sodium-containing lithium will be slurried in a suitable inert organic liquid reaction medium. Since it is recommended to reflux the reaction mixture for best yields and since the reaction proceeds favorably at moderately elevated temperatures, the liquid should boil at a reasonable temperature at atmospheric pressure, say not over about 40° C. Aliphatic hydrocarbons are especially suitable, such as pentane, isopentane, petroleum ether, and the like. Pentane is preferred.

The amount of liquid is not critical since it merely serves as liquid medium for holding the lithium in dispersed condition for contact with the added t-butyl chloride for conversion to t-butyllithium. Generally, the concentration of t-butyllithium in the final mixture will range from about 5 to about 35%, by weight, and preferably from about 15 to about 25%.

In initiating and carrying out the reaction, the t-butyl chloride advantageously as a solution thereof, is preferably added gradually to the lithium dispersion. This addition generally takes place over a period of from about 1 to about 4 hours, preferably from about 2 to about 3 hours.

The slurry is advantageously at an elevated temperature during the reaction and particularly at refluxing to insure maximum rate of reaction, during at least the major portion of the reaction. Since the reaction is somewhat exothermic, the above-mentioned rate of addition of the t-butyl chloride to the lithium dispersion is preferably such as to maintain such refluxing conditions. The final stages of the reaction can take place with the mixture standing in a relatively quiescent state. There is no need to exceed moderately elevated temperatures and the reaction proceeds at a favorable rate at about 40° C. and below.

The reaction is normally carried out in a substantially oxygen-free atmosphere, as under an atmosphere of an inert gas such as argon, nitrogen, and the like.

Following the reaction, precipitated lithium chloride and any unreacted material may be removed, as by filtering, and the t-butyllithium solution may be utilized as such or the t-butyllithium recovered separately following well known techniques.

The foregoing has dealt with the conventional process, and the present invention is concerned with the inclusion of at least 0.3%, by weight, and preferably at least about 0.5%, of the defined lithium alkoxide based on the weight of the t-butyl chloride, in contact with the reactants in the reaction medium. While there is no critical upper limit, and the amount of lithium alkoxide could go up to 2% or more, no advantage has been found with more than about 1% of the lithium alkoxide.

The lithium alkoxide, as stated, will have from 1 to 10 carbon atoms so that the alkyl group may be methyl, ethyl, propyl, butyl, amyl, hexyl, heptyl, octyl, nonyl or decyl. Especially desirable are the lithium butoxides, particularly lithium t-butoxide.

Lithium alkoxides may be prepared, for example, by reacting lithium with the corresponding alkyl alcohol. Thus, although the lithium alkoxide as such may be added to the reaction mixture, it is much more economical simply to form the lithium alkoxide in situ in the reaction medium as by adding the corresponding alcohol. Hence, the particularly preferred embodiment of the present invention involves this addition of the alkyl alcohol containing from 1 to 10 carbon atoms. Lithium t-butoxide may also be formed in situ by oxidation of a small amount of the t-butyllithium being formed. This may be accomplished by bubbling air through the reaction mixture in an amount to provide the desired amount of lithium t-butoxide in the reaction mixture.

The invention will be more readily understood from a consideration of the following examples which are given for purposes of illustration only and are not intended to limit the scope of the invention in any way.

EXAMPLE 1

This example illustrates the addition of a lithium alkoxide as such to the reaction medium.

A 3-necked, round-bottom, 500 ml. flask, equipped with a stirrer, pressure-equalizing dropping funnel and reflux condenser, is flushed with argon. The flask is then charged with a dispersion of 9.0 grams 1% sodium-lithium in 250 ml. of pentane (essentially n-pentane). Fifty-five ml. of t-butyl chloride conatining 0.3 g. of lithium t-butoxide are then added, under argon, over a 2¼ hour period with the mixture kept at reflux. The mixture is stirred for an additional hour and then filtered. The yield of t-butyllithium is 70% based on the t-butyl chloride by total base titration.

EXAMPLE 2

This example illustrates the preparation of t-butyllithium without the lithium alkoxide used in accordance with the present invention.

A 3-necked, round-bottom, 500 ml. flask, equipped with a stirrer, pressure-equalizing dropping funnel and reflux condenser, is flushed with argon. The flask is then charged with a dispersion of 9.0 g. 1% sodium-lithium in 70 ml. of sodium-dried pentane. A solution of 55 ml. t-butyl chloride (free of t-butyl alcohol) in 180 ml. pentane is added over a 2.5 hour period with the mixture kept at reflux. The mixture is stirred for an additional hour and filtered and the solution is permitted to stand overnight. The yield of t-butyllithium is 40.0% based on t-butyl chloride by total base titration.

The following Examples 3–9 illustrate the process of the present invention forming the lithium alkoxide in situ by addition of the corresponding alkyl alcohol.

EXAMPLE 3

The procedure of Example 2 is followed except that 0.25 ml. of t-butyl alcohol (0.5%, by weight, based on the weight of the t-butyl chloride) is added to the t-butyl chloride before it is added to the lithium slurry. The yield of t-butyllithium is 74.2% by total base titration.

EXAMPLE 4

The procedure is the same as in Example 3 except that 0.9 ml. of t-butyl alcohol (1.5%) is added to the t-butyl chloride. The yield of t-butyllithium is 74.0% by total base titration.

EXAMPLE 5

The procedure of Example 2 is followed except that all of the pentane (250 ml.) is associated with the 1% sodium-lithium dispersion and none with the t-butyl chloride, 0.5 ml. of n-butyl alcohol is added to the t-butyl chloride before its addition to the lithium slurry, this mixture is added to the lithium dispersion over 3 hours with refluxing and the mass stirred for an additional 1.5 hours before filtering. Analysis after standing overnight shows 68% yield of t-butyllithium based on total base titration.

EXAMPLE 6

The procedure of Example 5 is followed except that 0.5 ml. of sec-butyl alcohol, instead of n-butyl alcohol, is added to the t-butyl chloride. The yield of t-butyllithium is 78% by total base titration.

EXAMPLE 7

The procedure of Example 5 is followed except that 0.5 ml. of n-decyl alcohol, instead of n-butyl alcohol, is added to the t-butyl chloride. The yield of t-butyllithium is 55% by total base titration.

EXAMPLE 8

The procedure of Example 5 is followed except that 0.5%, by weight, of methanol, based on the weight of the t-butyl chloride, instead of n-butyl alcohol, is added to the t-butyl chloride. The yield of t-butyllithium is 59% based on the t-butyl chloride on total base titration.

EXAMPLE 9

The procedure of Example 5 is followed except that the reaction medium is 250 ml. of isopentane, and 0.5%, by weight, of t-butyl alcohol, based on the weight of the t-butyl chloride, instead of n-butyl alcohol, is added to the t-butyl chloride. The yield of t-butyllithium is 70% based on the t-butyl chloride on total base titration.

The following example illustrates the process of the present invention wherein the lithium alkoxide (lithium t-butoxide) is formed in situ by the oxidation of a small amount of the t-butyl lithium.

EXAMPLE 10

The procedure of Example 5 is followed except that no butyl alcohol is added, the t-butyl chloride is added to the lithium dispersion over 2¼ hours with refluxing, 225 ml. of air are passed into the reaction mixture over the refluxing period and the mixture is stirred for an additional hour before filtering. The amount of oxygen supplied by the air is that required to provide 0.5%, by weight, of lithium t-butoxide based on the weight of the t-butyl chloride. The yield of t-butyllithium is 7% based on the t-butyl chloride by total base titration.

In the light of my findings as illustrated above, it is possible that the erratic yields of t-butyllithium mentioned previously herein were due to the presence or absence of minute amounts of t-butyl alcohol in commercial t-butyl chloride. Certain commercial t-butyl chlorides do contain t-butyl alcohol as an impurity. I have found as much as 0.28% in one rather extreme lot. At any rate, I have found that the yields of t-butyllithium can be markedly improved in a controlled and consistent manner by the inclusion of a definite amount of a lithium alkoxide—at least 0.3%, by weight, based on the t-butyl chloride.

Modification is possible in procedural details as well as in the selection of materials without departing from the scope of the present invention.

I claim:

1. In the preparation of t-butyllithium by reacting t-butyl chloride with lithium containing a small amount of sodium, the improvement which comprises the step of providing, in contact with the stated reactants, a lithium alkoxide containing from 1 to 10 carbon atoms in an amount of at least 0.3% by weight, based on the weight of the t-butyl chloride.

2. The process of claim 1 wherein said lithium alkoxide is provided by adding an alkyl alcohol containing from 1 to 10 carbon atoms to the reactants.

3. The process of claim 1 wherein said lithium alkoxide is a lithium butoxide.

4. The process of claim 3 wherein said lithium butoxide is provided by adding a butyl alcohol to the reactants.

5. The process of claim 3 wherein said lithium butoxide is lithium t-butoxide.

6. The process of claim 5 wherein said lithium t- butoxide is provided by adding t-butyl alcohol to said reactants.

7. The process of claim 1 wherein said lithium alkoxide is in an amount from about 0.5 to about 2%, by weight, based on the t-butyl chloride.

8. The method of claim 5 wherein said lithium butoxide is provided by oxidation of t-butyllithium in the reaction mixture.

References Cited

Lochmann et al., Chem. Abst. 63 (1965), p. 7027.
Abstract of Collection Czech. Chem. Commun. 30 (1965), pp. 2187–95.

HELEN M. McCARTHY, *Primary Examiner.*

A. P. DEMERS, *Assistant Examiner.*

UNITED STATES PATENT OFFICE
CERTIFICATE OF CORRECTION

Patent No. 3,420,903                          January 7, 1969

William Novis Smith, Jr.

It is certified that error appears in the above identified patent and that said Letters Patent are hereby corrected as shown below:

Column 1, line 28, "marketedly" should read -- markedly --. Column 4, line 42, "7%" should read -- 72% --.

Signed and sealed this 17th day of March 1970.

(SEAL)
Attest:

Edward M. Fletcher, Jr.

Attesting Officer

WILLIAM E. SCHUYLER, JR.

Commissioner of Patents